May 8, 1956  E. B. McMILLAN ET AL  2,744,380
METHOD OF GENERATING JET POWER THROUGH SULFIDE REACTION
Filed Oct. 2, 1946  3 Sheets-Sheet 1

INVENTORS:
Edward B. McMillan,
Dudley F. Straubel.
BY
George B Willcox.
ATTORNEY May 8, 1956  E. B. McMILLAN ET AL  2,744,380
METHOD OF GENERATING JET POWER THROUGH SULFIDE REACTION
Filed Oct. 2, 1946  3 Sheets-Sheet 3

INVENTORS:
Edward B. McMillan
Dudley F. Straubel
BY
George B. Willcox.
ATTORNEY

United States Patent Office 2,744,380
Patented May 8, 1956

2,744,380

METHOD OF GENERATING JET POWER THROUGH SULFIDE REACTION

Edward B. McMillan, Wakefield, and Dudley F. Straubel, Malden, Mass.

Application October 2, 1946, Serial No. 700,650

17 Claims. (Cl. 60—35.4)

The nature and objects of our invention are as follows:

The occasion or incidental cause of this invention is the present need for improvement in methods and means for developing motive power in jet-actuated power plants such as are used in jet engines for aircraft; projectiles propelled by chemical jet action and employing oxygen-alcohol powered devices, jet auxiliary motors for assisted take-off, and the like.

The significance or import of our concept has to do with the attainment of improved efficiency in operation, simplicity of method and structure, absence of elaborate moving parts, adaptability for a great number of specific uses under widely different circumstances, and greater output of useful work per unit of space required for the power plant.

The main objectives of our present improvement are to provide a jet reaction power plant in which the flow of gas and other mass through the discharge orifices is the product of a particularly high exothermic reaction that consists of a series or chain of parallel and successive exothermic reactions, each generating products that comprise the ingredients for the next and for the final reactions.

Also, a principal objective is to attain unusually high efficiency and a final high energy gain, by creating an unusually large volume and mass of exhaust products, possessing unusually high pressure and jet velocity, and by causing the initial ingredients to go automatically through such successive exothermic reactions.

Another principal objective is to attain in an engine the formation of one of a group of specified sulfides; followed by the oxidation of the sulfide with air. The air may be obtained according to known ram-jet principles.

The method of attack used by us to solve the many problems presented by our main objectives was:

(1) To find a particular class of reducing-agent reactants, namely, the sulfides and hydrosulfides of those members of a certain section of the well known periodic table of the elements, including hydrogen and boron, which are located above hydrogen in the equally well known electromotive force series of the elements. This section of the periodic table is defined as the following: (a) the first and second short periods of groups one and two; (b) the first, second, and third long periods of groups one and two; (c) and the first and second short periods of group three. Boron is included, although its status with respect to the electro-chemical series is not well established, in spite of its electropositive nature. Its chemical reactions make it in many respects similar to aluminum, of which it is considered a congener. The elements having these positions in the electromotive force series and in the periodic table, in common, are the following: lithium, sodium, potassium, rubidium, cesium, hydrogen, calcium, strontium, barium, beryllium, magnesium, zinc, cadmium, and aluminum.

(2) We found it preferable to have these sulfide reactants fresh and ready for reaction in their most active state by forming them in the power plant from their constituents or from compounds containing them, and then using them in the next instant. We have also found that we could carry them already formed and then react them, especially hydrogen sulfide and the hydrogen polysulfides. The formation of these sulfides in the power plant proved to be valuable, releasing heat and near explosive energy at a sufficient rate to contribute substantially not only to the reactivity of the sulfides, but also to the weight, energy, and velocity of the mass of the final reaction products.

Due to the amphoteric properties of sulfur—we get two reactions in succession, an operation which is highly desirable and is believed to be new in jet propulsion methods and practice.

(3) Having obtained the desired class of reactants in a very reactive state, we then reacted them so as to create a mass having high energy and velocity for jet discharge. To accomplish this the reactants were oxidized in such a way as to form vaporous products and to increase the weight, velocity, and energy of the total mass in action. This mass was further increased by lowering the melting point of the non-vaporous reaction products, so that they would be in a liquid state, entrained in the moving mass of vapor, permitting their discharge and gradual reduction in the weight of the power plant. Where the formation of the sulfide supplies enough energy fast enough the oxidation reaction is considered optional. However, oxidation usually increases further and to advantage, the energy and velocity of the jet thrust.

(4) The foregoing may be summed up by saying that we convert into a vaporous jet discharge by oxidation or by treatment with a non-oxidizing acid, or water, sulfides or hydrosulfides of a given group of elements. Where necessary to impart sufficient reactivity to the sulfide, we manufacture it in the course of the operation of the power plant and use it almost instantaneously. The oxidizable character of the sulfides has not been generally appreciated, but we have found means of obtaining violent oxidation.

These interreactions were then planned to consist of a chain or series of parallel and successive exothermic reactions, each reaction generating products which are to be the ingredients for the next and for the final reactions.

We also devised a number of typical power plants, with load storage, reaction chambers, gas passageways, generators, mixing and combustion chambers, heat transfer devices, and regulators, three such plants being illustrated and described herein for purposes of disclosure of our claimed invention.

In general the following results are attained by our invention.

The provision of a power plant that can be used to propel rockets, planes, boats, torpedoes, other projectiles or physical objects. It can operate in air at atmospheric pressure, or in water, or even in rarefied air.

The available energy generated in this plant is higher than that attained in liquified oxygen-hydrogen powered devices.

It produces a mass and volume of material moving at adequate velocity and pressure, solely by chemical reactions and therefore without turbocompressors, pumps, or similar moving parts.

Our method can be carried out in a power plant designed to permit ready disassembling for renewal and refueling.

Our power plant can be made expendable so that power can be obtained in part by chemical reaction of the members of the power plant itself and their conversion into expanding gases to be utilized in the power jets.

The power plant is adapted to operate under conditions peculiar to the widest ranges of commercial and military use, such as jet-assisted acceleration of aircraft while in flight; propulsion of torpedoes and waterborne craft; stratosphere flight projectiles; aircraft; and high powered flight with long thrust time for rockets. It is also useful for jet-assisted take-off (JATO).

The potassium permanganate decomposition with acid and the hydrogen peroxide decomposition with permanganates as heretofore used for jet thrust will be exceeded by an enormous factor, not less than 70 and probably greater than that.

Our invention provides a power plant well adapted for use submerged in water to give a "wake-less" operation. It includes employing the linings of reaction chambers as catalysts in the oxidation of sulfides in those chambers. In some installations the water or air medium in which the chemical power plant is submerged may be consumed as a part of the chemical ingredients of the charge.

Reaction violence is controlled by chemical means and chemical means is employed to predetermine the rate at which reactions shall occur in the power plant.

Our invention provides means for reacting substances without diverting much of the produced power to auxiliary services such as the operation of compressors which heretofore have been required to keep the reactions at sufficient pressure.

The foregoing and certain other objects of our invention, which will appear later in the specifications, are attained in a way that will be understood upon considering the following typical example, and typical modifications, of a suitable chemical jet power plant or engine and its principle of operation.

For purposes of disclosure we illustrate diagrammatically the principal features of our invention. The drawings are not to scale, certain parts being exaggerated for clarity in disclosing the best mode in which we have contemplated applying the principle of the invention, and to distinguish it from other inventions.

Three preferred examples embodying our invention now will be described. The first, Figs. 1, 2, 3, was selected for purpose of illustration because it shows the use of a large number of related reactions to accomplish our process in a preferred apparatus. The second example, Figs. 4, 5, 6, uses substantially the same reactions as in example one, but with a different apparatus, in order to show that our process is not dependent upon a particular form of apparatus. The third example, Figs. 7, 8, describes the process adapted for use in a simpler and more preferred form.

The first example possesses the advantage of not requiring refrigeration, and being free of instable fuels, while the simplification of our process used in the third example offers the highest energy-weight ratio.

FIRST EXAMPLE: A LARGE NUMBER OF RELATED REACTIONS

Figures 1, 1A, 2, 3, 3A:
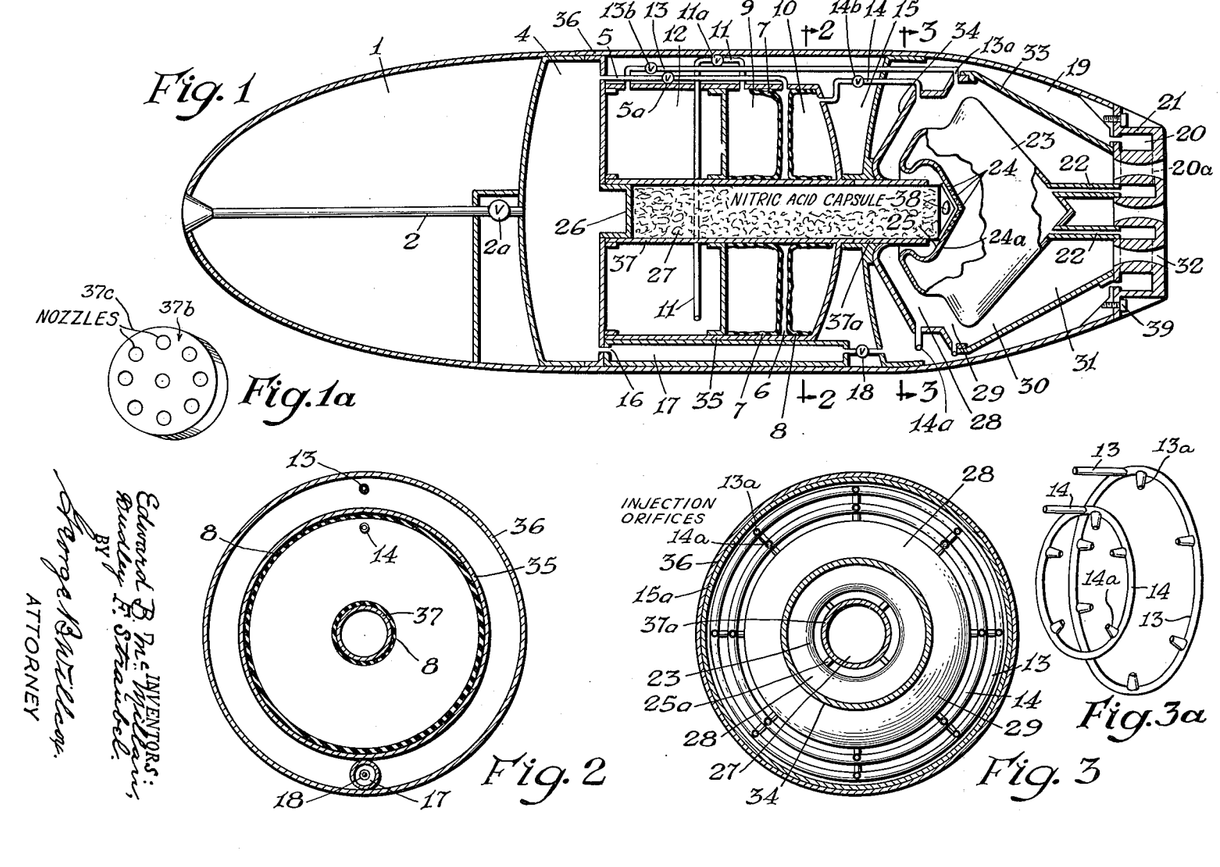
Fig. 1 is a diagrammatic longitudinal view of our invention, partly in section, and broken away in parts.
Fig. 1a is a detail view of an optional nozzle plate for the central cylinder shown in Fig. 1.
Fig. 2 is a transverse sectional view on the line 2—2 of Fig. 1.
Fig. 3 is a transverse view partly in section on the line 3—3 of Fig. 1, the container 23 not being shown in section.
Fig. 3a is an exploded detail view of members 13, 14, of Figs. 1 and 3.

An arrangement of apparatus for storage and use with stable reactants is comprehensively illustrated in Figs. 1, 2, 3.

In general, such apparatus may comprise a bullet-shaped nose and an outer jacketed casing. In our invention we are primarily concerned with events in the combustion chamber. We shall refer to other parts of equipment as "associated apparatus."

Cargo space in the nose is designated by numeral 1. Numeral 2 designates an inlet, controlled by valve 2a, for taking in water or air from the surrounding medium by ram or scoop action due to the forward speed of the power plant.

Various operating elements may be arranged in the jacketed casing, as indicated in Figs. 1, 2, and 3.

Immediately aft of the nose is a chamber 4 to receive water or air, as from inlet 2, and to generate pressure to feed the reactants. Chamber 4 communicates through conduit 5 and metering valve 5a with spool-shaped space 6 enclosed in shell 35, containing, (and divided transversely into two halves by) flexible bags 7 and 8, the edges of which are attached and sealed to the walls of spaces 9 and 10. Pressure built up in chamber 4 exerts itself against these bags. When water or air is not available from the outside medium at sufficient pressure, as is usually the case before speed in movement of the power plant has been attained, gas is generated in chamber 4 as a substitute. The pressure thus exerted against bags 7 and 8 empties their contents through connecting conduits 11 and 14, respectively. Bag 7 contains water, which is injected through conduit 11 and metering valve 11a into space 12, where it reacts with the contents to generate oxidizing agents, such as oxygen and hydrogen peroxide. These contents may include a stabilizing agent to prevent premature decomposition. The applied and generated pressure forces the oxidizing agents through conduit 13, metering valve 13b, and injection orifices 13a into reaction zone 29 of the main reaction chamber 33.

The pressure in space 6 also empties bag 8 of its contents, a non-oxidizing acid, through conduit 14, metering valve 14b and injection orifices 14a located in shell 34 into reaction zone 28 of the main reaction chamber which comprises zones 28, 29, 30, 31, within shells 33 and 34, for the generation there of hydrogen sulfide and easily liquified or vaporized by-products.

In approaching the main reaction chamber, conduits 13 and 14 pass through space 15 which separates and insulates the compartments forward of it from the heat of the main reaction chamber. They then pass through space 19, containing the liquid metallic alloy reactant. In the last stages of the complete reaction of the power plant, this space may contain the feed pressure gas generated in chamber 4.

In the instant case it is water that is injected into compartment 4, where it reacts with calcium hydride contained therein to generate hydrogen gas. This gas pressure forces dilute formic acid from bag 8 into the main reaction chamber. It also forces water from bag 7 into the chamber 12, where it reacts with sodium peroxide to generate free oxygen and sodium hydroxide. The latter is retained in chamber 12 unless it is desired to obtain sulfuric acid in the jet discharge.

The pressure in chamber 4 also exerts itself through orifice 16, moisture trap 17, and conduit 18, against the liquid alloy reactant in chamber 19. This alloy, which comprises elements of the periodic table and of the electromotive force series, previously specified, is thereby driven into and through space 20 contained in nozzle plate 21. From there passages 20a lead to conduits 22 that direct the flow into container 23, having the shape of a double cone and occupying the central portion of the main reaction chamber. This pressure forces the liquid alloy out through orifices 24 in the forward inverted face 25 of the double cone 23, bursting the seal material 24a placed over them.

The forward end of double cone 23 is attached to portion 37a by supports 25a, shown in Fig. 3.

The pressure in chamber 4 is further exerted for the purpose of feeding reactants into the main reaction chamber as follows: It is directed against the face of piston 26, which slides in central cylinder 37 to feed sulfur charge 27 against face 25 of container 23. At that face it reacts with the reactant emerging from orifices 24 after breaking nitric acid capsule 38. That portion 37a of the central cylinder 37 extending into the main reaction chamber is replaceable when eroded by re-use.

The sulfur charge may be fed into the power plant in the molten state. It may be included in a blast of hydrogen or hydrogen sulfide. It may also include sodium, potassium, or lithium, the sulfur and the metals being intimately mixed. It may also include other metals and hydrides from the selected series. These may be in a granulated form. It may include magnesium and calcium which will later alloy exothermically. Catalysts, fluxes, and sulfides for later reactions may also be included.

Here it should be noted that if it is elected to carry hydrogen sulfide as an already prepared reactant rather than as a freshly generated one, it may be stored in cylinder 37 and an injection nozzle or nozzles placed at the aft end for its injection into zone 28 of the main reaction chamber. For that purpose a nozzle plate 37b (Fig. 1a) may be inserted in the right-hand end of cylinder 37, Fig. 1b. The plate may have nozzle openings 37c therethrough as shown. Jacket space 19 may be similarly used. An oxidizing agent may then be injected at orifices 14a as well as at orifices 13a, in order to create a jet discharge possessing sufficient energy for propulsive or other work. That other apparatus may be used for the same purpose is illustrated in Figures 4, 5, 6, 7, and 8. Means of carrying and generating hydrogen sulfide are illustrated under "C" reactions in the table of reactions.

In a second variation of the process, hydrogen sulfide generated from metallic sulfides acquires sufficient energy therefrom, adequate for accomplishing useful work with the jet discharge. Injection of oxidants at orifices 13a is then unnecessary and these may be used as well as orifices 14a for the injection of non-oxidizing acid.

A third variation in the process comprises the oxidation of metallic sulfides rather than hydrogen sulfide to create an adequate vaporous discharge. Reactions "E" in the table of reactions illustrates a number of such oxidation steps. As previously stated, hydrogen and certain metals and boron and hydrides may be considered to fall in the same well-known chemical class, and we consider them interchangeable under the conditions outlined in this invention. As stated in the just previous second variation in the process, the metallic sulfides may instead be treated with a hydrogen bearing agent such as non-oxidizing acid, for the creation of a useful jet discharge. Use of an oxidizing acid falls under the instant third variation, although at low temperatures the action of both acids is similar. As shown in the table of reactions, under "E," other oxidizing agents such as hydrogen peroxide may be used.

Having explained in general the arrangement of the nose, the jacket of the outer casing, and the general features of feeding reactants to the main reaction chamber, reference is now made to the more specific features of the power plant proper.

The power plant is started in the instant case by injection of water through control valve 2a in chamber 4. Pressure for feeding reactants is generated by the reaction of the water and calcium hydride or other gas generating reactants. Generation of a non-oxidizing gas is preferred in the instant design and is illustrated in the table of reactions under reaction "A." The reactants injected into the main reaction chamber are initially sealed from it by valves and breakable seals. The latter are broken and removed by feed pressure.

THE MAIN REACTION CHAMBER

The essential ingredients for generating power according to our invention are processed in the chamber comprising reaction zones 28, 29, 30, and 31, Figs. 1, 2, and 3, which depict a typical arrangement of apparatus for carrying out the process. However, the steps can be successfully performed by other means and arrangements of devices than those shown, which are merely illustrative, although preferred by us.

The main reaction chamber consists of the space between central double-cone shaped container 23 and walls 33 and 34. This space is so arranged as to provide for gradually increasing volume and for injection, with suitable cross-current, of additional reagents at appropriate points. The sulfides formed exothermically at face 25 of the double cone 23 burst violently outward into reaction zone 28 into the current of non-oxidizing acid injected by orifices 14a. The exothermic reaction product is a gas, hydrogen sulfide, entraining a molten mixture of sodium and potassium formates, and some dissociation products of these.

The flow proceeds vigorously outward in reaction zone 29 to the maximum diameter of the main reaction chamber. There the oxidizing agents enter the stream, being injected by orifices 13a. In the instant case the oxidants consist principally of free oxygen accompanied by a little hydrogen peroxide, a little alkali peroxide, and traces of alkali hydroxides. The cross-current of oxidizing agents with the hydrogen sulfide produces a new violent exothermic reaction, which discharges steam, sulfur dioxide, molten solids, and miscellaneous minor reaction products, depending upon the efficiency and completeness of reaction. The presence of considerable quantities of steam facilitates the conversion of heat stored in the discharge into mechanical energy.

This discharge bursts into reaction zones 30 and 31 where further mixing of the flow and final reaction of its constituents occurs. The violent rush of a mass of vaporous, powdered, and molten material continues out through the jet nozzles 32. On exhausting beyond these they perform useful work, propelling the power plant forward by jet reaction or driving physical obstacles to the rearward. The nozzles may be conventional in form, say, convergent-divergent rearwardly. The nozzle plate 21 is jacketed at 20 and arranged so as to collect heat dissipated by the discharge stream passing through the nozzles. The plate is attached by safety shear studs 39, which fail if the safe operating pressure for the main reaction chamber is exceeded.

The foregoing description of a typical embodiment of our invention may be operated in rarefied atmosphere, or in normal atmosphere, or submerged in a liquid, for example water. The following materials specification provides for re-use of the power plant structure, so that the same container, controls, conduits, reaction chambers, etc. may be capable of being recharged with chemical load and used a number of times.

Acid lines in the vicinity of heat of the main reaction chamber may be an iron alloy conduit coated inside with gold, iridium, or platinum. Elsewhere they may be any one of a number of acid-proof plastics or rubber except that oxidant carrying lines, such as 13, must be non-oxidizable. Injection orifices 14a may consist of a small diameter tube made from iridium, platinum, or tungsten wire. For expendable installations, colloidal graphite coatings and silicic acid coated graphite orifices may be used. Spaces 10 may be lined with acid proof rubber or plastic.

Conduit 11, valve 11a, bags 7 and 8, and spaces 9 and 10 may be lined with acid-proof rubber. Space 5 and conduit 13 must be lined with a non-oxidizable coating. In heated zones this may be gold, platinum, or iridium and elsewhere a non-oxidizable plastic such as polyvinylidene chloride or glass. Silicone plastic may also be used. Pipe fittings and valves exposed to the oxidant may be best sealed with silicone grease.

The walls 33 and 34 and of 23 lining the main reaction chamber may consist of graphite backed and strengthened with a heat and acid resistant iron alloy. Corrosion and heat resistant alloys of nickel, iron, and molybdenum or of cobalt, chromium and tungsten are suitable. The graphite surfaces may be sealed and coated with catalysts such as silicic acid gel and manganous oxides. The silicic acid coating also serves to dehydrate the power plant during storage periods. (Expendable power plants may have a reaction chamber lining of iron alloy alone coated with colloidal graphite and silicic acid gel.) The construction of the nozzle plate 21, nozzles 32 and conduits 22 may be similar to that of the walls 33 and 34. Portion 37a of the central tube may be of reinforced graphite.

Special attention other than to the usual standards of mechanical and chemical engineering design need not be paid to the balance of the power plant, except that oxygen bearing materials should be avoided for the linings of the spaces and conduits coming into contact with reducing agents such as hydrogen and the metallic reactants. The sulfur charge may be inserted in cylinder 37 in a magnesium or a nitrocellulose plastic tube.

If the power plant is to be entirely expendable, the lining of the combustion chamber may be made of alloys of aluminum, magnesium, zinc, beryllium and others of our specified reducing-agent reactant metals.

Having described and illustrated a suitable type of power plant which can be readily modified to meet all foreseeable circumstances of use and which may be readily elaborated in design by those skilled in the art so that the reactants may be supplied from remote tanks; we shall presently describe the specific series of reactions which occur.

An advantage of the instant design is that the reactants may be stored indefinitely without deterioration. In this design the heat-weight ratio has suffered by the weight of materials required for the generation of the oxidizing agent. This may be alleviated, with some reduction of storeability, by the use of stabilized hydrogen peroxide.

In considering the following description of our chain of reactions and their modifications, it is to be remembered that, speaking generally, the principle of the entire overall reaction series is found in the exothermic reacting of a sulfide of a particular chemical type by formation of the salt of an acid or by oxidation so as to give it the energy to act as a propulsive jet. When a sulfide of a metal or boron is used it is usually first manufactured exothermically in the course of the power plant reaction, so as to be available while in a sufficiently reactive state. When the sulfide is that of hydrogen it is often carried already formed, as a reactant for energy creation by oxidation, but it may also be manufactured during the power plant reaction, this being the case in the instant design which has been selected for purpose of description.

*Chart outline of general process description, as performed in embodiment, Figs. 1, 2, 3*

| Step I | Results |
|---|---|
| | Result of Step I is New Fuel 3 |
| Introduce into a combustion chamber (substantially in the absence of air or other oxidizing agents): Two fuels, 1, 2; a fluxing agent; and at least one reaction control substance.<br>NOTE.—Fuels 1 and 2 below may be premixed, or in briquettes, or delivered in separate streams to combustion chamber; or they may already have been reacted to give a new hot fuel.<br>Item:<br>(Fuel 1)—A metal, or metal peroxide, or hydrogen, or metal hydrides, or boron, or boron hydrides, or borines, or metallic boron hydrides, or hydrazine compounds, or hydrazoic compounds.<br>(Flux)—When such metals or metal compounds are used, a fluxing agent is added, as disclosed.<br>Item:<br>(Fuel 2)—Sulfur, or hydrogen sulfide, or hydrogen polysulfides, or other sulfur carriers releasing sulfur to the above metals and reducing agents of fuel 1, as described herein.<br>(Reaction control)—A reaction control substance such as hydrazine hydrate or ammonia is added. | Fuels 1 and 2 give a vigorous heat-liberating and reactive sulfide-generating reaction "B" and thereby create a new hot fuel (3).<br>NOTE.—Fuel 3 can be injected into and driven as a stream through the final combustion chamber by its own expansive force; or it may be introduced by other means. |
| Step II | Result of Step II |
| Add to the New Fuel 3 an oxidizing agent or other gas-generating agent; or add one followed by the other.<br>The oxidation reaction can be accomplished by reaction "D" or "E." Use reaction "D" after gas-generating reaction "C"; or use "E" after "B."<br>There is a choice of following "C" by an oxidation reaction "D," or not, as may be required.<br>Add oxygen-bearing catalysts as disclosed. | Gives an explosive reaction.<br>Creates a gas-like jet-material of high density and propulsive power due to presence of sulfur compounds.<br>NOTE.—Generation of the oxidant with reactions "F" and "G" is optional. |
| Step III | Result of Step III |
| Discharge said jet-material from the combustion chamber. | Power for jet propulsion chemically developed within the combustion chamber; set forth in the statement of objects. |

In the process description that follows for the instant design, the following weight proportions and ingredients are employed. In practice they may be varied, particularly where an excess of an ingredient is needed for a complete reaction:

| | Per cent |
|---|---|
| Sulfur | 5.9 |
| Formic acid | 17.2 |
| Sodium | 3.8 |
| Sodium peroxide | 52.7 |
| Potassium | 8.0 |
| Water | 12.4 |

The sulfur is reacted with the sodium and potassium to produce a reactive metallic sulfide. The latter is then reacted with formic acid to yield hydrogen sulfide, which is then reacted with oxygen generated from the parallel reaction of sodium peroxide with water. The final principal reaction products, steam and sulfur dioxide, together with secondary products such as those resulting from dissociation, incompletely reacted materials including hydrogen sulfide and sulfur, products of additional reaction such as sulfurous and sulfuric acids, and fused solids are directed so as to complete the physical thrust reaction. As pointed out elsewhere, there are alternative reactions adhering to the process principle. Among them, one provides the use of concentrated stabilized hydrogen peroxide, rather than sodium peroxide, to save weight. Another avoids acidity of the exhaust by reacting a metallic sulfide to exothermically generate and exhaust steam and fused solids. Still another reacts the metallic sulfide to exothermically generate and exhaust hydrogen sulfide and fused solids without further reaction. These reactions will be set forth in more detail in the discussion that follows. The instant design has been selected primarily to illustrate a broad application of the principle of the invention.

Fluxing agents and catalysts are included among the reaction ingredients, also. The former assist in the fusing and entrainment in the efflux of solid secondary reaction products. Important among these are boron and lithium and their compounds, including lithium boron hydrides, the reaction products of which serve as fluxes. The nature and melting points of the solid products varies with reaction temperature, since the degree of dissociation is dependent upon temperature. In the instant design, the low temperature products are metallic formates, possessing low-melting points, while the higher temperature products, the oxides, have higher melting points. This prevents the choking of the power plant with solids at the start of the reaction. The fluxing overcomes it during the reaction peak period. The instant design provides for the use of a group of short jet efflux nozzles to save space, but any engineer troubled with disposal of solids in his application may use a longer single nozzle to avoid the baffling effect of the multiple-nozzle plate. In addition, in the planning of low-temperature fluxing solid secondary products, for other design embodiments, the art of selecting ingredients for fusible pyrometric ceramic temperature indicators can be drawn upon since these include many of the elements specified for our purpose. Catalysts including ammonia, water, and silicic acid are mentioned in the following paragraphs.

REACTIONS EMPLOYED IN MULTIPLE REACTION, EXAMPLE 1 OF PROCESS

*Reaction "A"*

Compartment 4, Figs. 1, 2, 3, contains calcium hydride into which is injected water from storage tanks in nose 1. When the power plant is operating submerged in water, it may be admitted into compartment 4 from this external medium, rather than stored. By weight, 46 parts of water are added to each 54 parts of calcium hydride to produce 5 parts of hydrogen and 95 parts of calcium hydroxide, as reaction "E–1" (see Table of Reactions, following). The hydrogen thus generated applies pressure to other reactants to bring about the flow of reactants into the main reaction chamber. The Table of Reactions lists variations on each process reaction; for example, A–1 and A–2 are variations of "A." Other reactions such as A–2 may also be used in the instant design. Other hydrides useable include those of magnesium, strontium, barium, lithium, potassium, sodium, rubidium, cesium, and boron. Aluminum powder may be included to release hydrogen from the hydroxide. The reaction products will vary with temperature, but only typical results are shown.

The rate of reaction may be predetermined by the increase in individual particle sizes of the calcium hydride, a larger size slowing the reaction. It may be continuously regulated by the rate of feed of water through valve 2a into compartment 4, but in the instant design, all the required water is injected before pressure is generated in compartment 4.

This pressure is applied to the following places: First, piston 26 to feed sulfur charge 27 into the main reaction chamber; second, through water trap 17 to liquid metal charge 19 to feed it into the main reaction chamber; third, into space 6 to empty the contents of bags 7 and 8 into the oxidant generator 12 and the main reaction chamber, respectively. The pressure applied to the oxidant generator also helps feed generated oxidants into the main reaction chamber.

*Reaction "B"*

Reaction "B" generates reactive sulfides with the liberation of considerable heat. In the instant design these are then further reacted in reaction "C" with non-oxidizing acids and water to generate hydrogen sulfide. In this step, metallic salts are formed as secondary products. The selection of the non-oxidizing acid as well as of the sulfides to be generated in "B" may be made so as to insure a sufficiently low-melting mixture of salts so that they may remain entrained in the jet discharge in a molten state. For further explanation, see description of reaction "C," to follow in its turn.

Parenthetically, it may be noted here that when practical considerations permit the use of hydrochloric acid in "C," salts will be formed that require high power plant temperatures to remain molten. In that event their melting point may be reduced by the use, in reaction "B," of lithium or lithium compounds such as lithium sulfhydride. Refer to reaction "C–3b." These substances may be mixed and fed into the combustion chamber with the sulfur charge. To obtain a melting point as low as 375 degrees centigrade the following weight proportions of chlorides should be formed: 34 parts potassium chloride, 5 parts potassium fluoride which may be included already formed and in the sulfur charge as a flux, 50 parts of lithium chloride, and 11 parts of sodium chloride.

As already indicated, the ingredients of reaction "B" are selected with the requirements of reaction "C" in mind. However, reaction "B" may be followed by reaction "E" and "C" may be omitted, as the basic principle is the exothermic generation of a vaporous discharge capable of exerting physical thrust, the key reactants being hydrogen sulfide or one or more of a related family of metallic sulfides.

In the instant design, the choice of formic acid for use in reaction "C" leaves considerable freedom in the choice of proportions for metallic ingredients for reaction "B," as sodium and potassium formates melt at low temperatures, 253 and 168 degrees centigrade, respectively. The following choice of metallic reactants is therefore made, giving a liquid alloy having a freezing point of nearly minus 10 degrees centigrade: 68 weight parts of potassium and 32 weight parts of sodium.

The preferred "B" reactions in the instant design are "B–1" and "B–1a," in which the alloy reacts with sulfur to exothermically form reactive sodium and potassium sulfides. Although not so specified in this design, the sulfur charge may also include metallic sulfhydrides such as sodium sulfhydride (see reactions "C–3" and "C–9"). Reactions "B–1" and "B–1a" call for the following weight proportions:

(B–1) Sulfur 22 parts to every 32 parts of sodium.
(B–1a) Sulfur 28 parts to every 68 parts of potassium.

For complete reaction, the products become 54 weight parts of sodium sulfide and 96 weight parts of potassium sulfide, respectively. A total of 50 weight parts of sulfur is required, therefore, for every 100 parts of metal alloy, but these proportions may be adjusted in power plant design assuming inefficient use of one or more reactants.

The "B" portion of the process is carried out in the power plant apparatus as follows: The sulfur charge 27 is moved through cylindrical tube 37 to the perforated face 25 of double cone 23. This charge may be enclosed in a thin case of magnesium or nitrocellulose, which is consumed in the main reaction as it is fed into the main reaction chamber. The sulfur reacts at face 25 with metal alloy being extruded in a spray from orifices 24 in the cone structure. The spray of metal mixes intimately and reactively with the sulfur vapor arising from the surface of the briquetted sulfur charge. The metallic sulfides formed at and near face 25 burst outward through reaction zone 28 of the main reaction chamber toward formic acid injection orifices 14a, in the vicinity of which reaction "C" occurs.

The feeding of sulfur into the reaction chamber for reaction "B" in various embodiments may be accomplished in various liquids, even in the metal alloy itself (when not preheated). A paste or an emulsion may be made with various liquids. In some cases the sulfur may be dissolved in them. The liquids themselves may serve as catalytic or accelerating agents which we will refer to as reaction control substantances, fluxing agents, fluxing and reaction control substances, and as fuels. Liquid reaction control substances for the oxidation of the sulfides of hydrogen which may also be used as sulfur carriers to feed it into the reaction chamber include liquid hydrazine compounds, such as hydrazine and hydrazine hydrate, and organic amines. Reaction control and fluxing liquids for the same purpose include boron carriers such as dihydropentaborane, borobutane, boron organic compounds, borontriamine, and borinoaminoborine. Fuels of a liquid nature which can be used to feed sulfur, include the polysulfides of hydrogen. These and the liquid hydrides of boron are particularly useful. Above 1.45 degrees centigrade, sulfur may be dissolved in hydrogen disulfide to the extent of 83 per cent of the weight of the latter. The chlorides of sulfur, carbon disulfide, and even liquid organic sulfur compounds find some use to transport sulfur.

It is desirable to obtain the finest state of subdivision of the sulfur and metal reactants, because the rate and violence of reaction is in proportion to the mobility of substances involved. In the instant example, this mobile effect is obtained by liquefying and spraying the metals and by exposing the sulfur to reaction heat to vaporize it.

Or, the desired fineness of particles can be obtained by putting the sulfur into solution or pulverizing it. Similarly, the metals may be fused or pulverized.

The reaction of our metals, particularly lithium, potassium, calcium, strontium, and barium, with sulfur to form the sulfides, and in fact the whole tempo of reaction of the various stages in the engine may be accelerated violently by the injection of reaction control substances such as hydrazine hydrate, hydrazine, or hydrazoic acid. This may be done in the zone of oxidation and even in the zone of formation of the metallic sulfides. In the latter case azides are formed, later decomposing with great violence. Reaction with the sulfur to form hydrogen sulfides also occurs, as shown in the Table of Reactions, Examples C-9 and C-10.

*Reaction "C"*

The purpose of reaction "C" is to create a blast of hydrogen sulfide gas capable of itself exerting a strong physical thrust or of being oxidized to augment such a thrust. In the instant design, the blast is further oxidized in reaction "D." Variations upon reaction "C" are listed in the Table of Reactions. Like the other reactions this list is inclusive rather than exclusive. The preferred variations in the instant design are "C-1" and "C-1a," employing reactants in the following weight proportions. (Note the formic acid specified may be dilute and at elevated temperatures water may be largely substituted for acid, the reaction products then being subject to less dissociation.)

(C-1)
63 parts formic acid (HCOOH)
54 parts of sodium sulfide from reaction "B" to yield for complete reaction approximately:
94 parts of sodium formate (NaCHO$_2$), melting point 253 degrees C.
24 parts hydrogen sulfide
(C-1a) consists of:
83 parts of formic acid
96 parts of potassium sulfide from reaction "B" to yield nearly
149 parts of potassium formate (KCHO$_2$), melting point 168 degrees C.
30 parts of hydrogen sulfide.

Employment of an excess of any ingredient may prove necessary, depending upon the efficiency of actual use.

The reaction takes place in zone 28 of the main reaction chamber, when the flow of metallic sulfides makes a cross-current with the formic acid injected by orifices 14a.

The Table of Reactions lists a number of means of oxidizing the hydrogen sulfide to impart to the jet discharge sufficient energy for physical thrust. The choice of means must vary according to the heat already contained in the reactants, the use of milder reactants being possible when the hydrogen sulfide has just been generated with a high heat gain. In the instant case, however, it is elected to employ oxygen as in reaction "D-1," the oxygen having been generated by a parallel reaction "F." The weight proportions and ingredients for "D-1" are approximately as follows:

54 parts of hydrogen sulfide from reaction "C"
76 parts of oxygen from oxidant generator 12 yielding at 100% conversion:
28 parts of steam
102 parts of sulfur dioxide.

The jet flow also includes approximately 243 parts of molten sodium and potassium formates and any incompletely reacted or dissociation products. The latter may include oxalates, hydrogen, aldehydes, carbon monoxide, carbon dioxide, etc. The heat gain may be restored by injecting an excess of oxidant to exothermically react some of them. Some catalysis of the reaction is accomplished by reaction control substances such as silicic acid and manganese dioxide with which the graphite walls of the main reaction chamber are coated. The completeness of oxidation is furthered by the presence of moisture in the stream of injected oxygen.

Favorable factors for the violent oxidation of the hydrogen sulfide include the heat already present.

In any given application of our process to an engine, the heat gain and the stability of the reaction products is in part also a function of empirical adjustment of reaction control substances and oxidizing agents. For example, under suitable adjustment the stability of the sulfur dioxide product may be such that major dissociation will not occur below 2000 degrees centigrade.

Reaction "D" occurs as the hydrogen sulfide generated in reaction "C" flows into the stream of oxygen injected by orifices 13a, located near the greatest diameter of the main reaction chamber. The flow of products and reactants continues into zones 30 and 31, where mixing and reaction continues. The stream finally flows through converging-diverging nozzles 32. Much of the heat not converted into thrust is accumulated by the liquid metallic alloy flowing toward the main reaction chamber through jackets 19 and 20 and double cone 23. Safety studs 39 are designed to fail in the event that safe internal operating pressures are exceeded.

The following reaction is not provided for in the embodiment of the process shown in the instant design but is described at this point because under suitable process conditions it may be used alternatively to reaction "D."

*Reaction "E"*

In the previous reaction the sulfide being oxidized was that of hydrogen, but the invention also provides for the oxidation of the metallic sulfides of the same chemical group to include a physical thrust reaction. In that case, reactions "C" and "D" are omitted. Only reactions "B" and "E" are used. Acidity of the final jet exhaust is largely avoided, and this may be considered a decided advantage under many conditions, particularly where the power plant is not part of a projectile. The oxidation reactions which will be presently described are "E-1" and "E-1a," involving reaction of hydrogen peroxide with metallic sulfides in a hot reactive state, especially such as follows immediately after their formation. The reaction products are steam and metallic sulfates. In order to insure the melting and entrainment of these in the jet discharge it is preferable to select weight proportions of sodium and potassium in reaction "B" so as to result in a low-melting sulfate mixture in reaction "E," such as the following, melting at about 560 degrees centigrade:

63 weight parts potassium sulfate
34 weight parts sodium sulfate
3 parts potassium chloride, introduced as a flux in the sulfur charge It is also advisable to use a large single exhaust nozzle rather than a group of small ones, to give the molten solids the greatest opportunity to escape, if their melting points are high.

Among the other sulfides of metals of our specified group, beryllium sulfide oxidizes with particular ease. The others are oxidized readily at the high power plant temperatures, especially with the oxidants and catalysts such as are generally described in this specification. Among these the hydrazine compounds are notable.

Reaction "F"

Reaction "F" is the generation of oxygen for reaction "D." Variation "F–1" is used in the instant design because it illustrates generation of the oxygen on the spot from stable easy-to-handle ingredients. This, however, involves the loss of weight economy.

The rate of generation of oxygen in "F–1" is limited by the fineness of sodium peroxide particles which can be used and may be accelerated by introduction of an oxidizing acid in the water charge. Other means of oxidation are illustrated in examples which follow and are listed in the Table of Reactions.

The oxygen may be stored rather than generated. It is obviously preferable to store an already prepared oxidizing agent except when it lacks stability for storage under the conditions of use.

In the instant design the use of hydrogen peroxide results directly in the generation at low temperatures of acid in the exhaust jet. This may be reduced somewhat by the decomposition of the peroxide with permanganate to generate oxygen. This reaction unless carefully arranged may prove very violent and erratic (see F–2 and F–3).

The weight proportions and reactants for "F–1" are as follows:

447 parts of sodium peroxide
105 parts of water
 yielding approximately:
94 parts oxygen, the weight required for "D–1"
460 parts sodium hydroxide.

The rate of generation of oxygen may not only be pre-regulated by sodium peroxide particle size and the use of some oxidizing acid in the water, but also by regulating the flow of water from space 9 to space 12 with a metering valve 11a in conduit 11.

The weight economy may be improved by forcing the sodium hydroxide into the stream of oxygen being injected into the main reaction chamber. The resulting "D" reaction then becomes "D–2." It is then preferable to employ a mixture of sodium and potassium peroxides so as to obtain a low melting sulfate mixture in the main reaction chamber, as in reaction "E."

Reactions "F–2" and "F–3" may be used as either a starting or booster reaction in the starting of the power plant reaction. For this purpose, a permanganate solution may be stored in the non-oxidizing acid line 14, between valve 14b and nozzle 14a, the latter being initially closed by a blow-out seal. When all seals are blown out by the initial creation of feed pressure, the permanganate solution is first injected into the main reaction chamber in zone 28. If hydrogen peroxide is not the principal reactant injected by orifices 13a, an initial charge of it stored in line 13 may be used. Its mixing in reaction zone 29 with the permanganate solution causes a violent exothermic reaction which raises the main reaction chamber to the necessary temperature for sure reaction of the main reactants.

Reaction "G"

Reaction "G" is the generation of hydrogen peroxide for use as an oxidant. It is an oxidant with which our sulfides are more reactive than many hydrocarbon fuels. This reaction is alternative to "F." Reactions illustrating the use of hydrogen peroxide are D–3, D–4, E–1, and E–1a. Unless used with metallic sulfides as in E–1 and E–1a, or in reduced quantities with hydrogen sulfide, as in D–3, an acid exhaust at low temperatures as in D–4 may be expected. It may also be carried already formed, as concentrations up to 90% are currently available.

The foregoing embodiment, described at length, avoids the hazards and other limitations surrounding the storage of instable or refrigerated fuels. Unlike many solid fuels now in use, there is small hazard in the manufacture of the ingredients of the instant design. The reactants themselves are of exceedingly common occurrence, rather than requiring special preparation. In further comparison with other schemes the mass of jet flow at any instant is particularly high. And then, the jet discharge is water soluble, suiting it to use for propulsion of underwater devices needing concealment.

USE OF BORON AND SULFUR

In the use of jet power engines we have found that boron, a congener of aluminum, may be employed to play the same useful and novel role as the other specified elements in the formation of a sulfide as the principal basis for our jet propulsion reaction. For purposes of description, therefore, we shall include boron in our group of fuels and call it a metal. It may be used alone or together with hydrogen or other of the specified metals, hydrides and sulfides. A special convenience is that the useful hydrides and halides are liquids and gases, rather than solids. The boron and the sulfur may be injected as liquid boron hydrides, such as $B_5H_9$ and $B_4H_{10}$, and as sulfur dissolved in liquid hydrogen polysulfides, reacting them to form the boron trisulfide. Typical reactions are B–4 and C–8. Boron trisulfide may be also formed by reaction or boron with a sulfide of hydrogen, as in reaction B–3. Various reactions may follow B–3 and B–4. First, boron trisulfide may be reacted with chlorine to generate gaseous end-products, reaction E–5a, followed by reaction with $H_2O$, which is reaction E–5b. Boron hydrides may be injected to accelerate the tempo of the overall reaction. Second, boron trisulfide may be directly reacted with $H_2O$, giving reactions C–6 and E–4. Boron hydrides may be injected to control the rate of the reactions, increasing quantity causing an acceleration. The hydrogen sulfide generated in reactions B–3, B–4, C–6, C–8, etc. may be further reacted with oxygen from the atmosphere as in a ram jet engine, or with other oxidants, as in the typical "D" reactions. Third, the boron trisulfide may be reacted with fluorine or hydrofluoric acid, giving reaction C–7, to generate gaseous end-products including hydrogen sulfide. The use of the above reactions is indicated wherever B, C, D, and E reactions are called for.

TABLE OF TYPICAL REACTIONS (A) *Feed pressure generating reactions*

(1) $CaH_2 + 2H_2O \rightarrow 2H_2 + Ca(OH_2)$ (2) $NaH + H_2O \rightarrow H_2 + NaOH$ (B) *Metallic sulfide generating reactions*

(1) $2Na + S \rightarrow Na_2S$ (1a) $2K + S \rightarrow K_2S$ (2) $2Na_2O_2 + 2S \rightarrow Na_2S + Na_2SO_4$ (2a) $2K_2O_2 + 2S \rightarrow K_2S + K_2SO_4$ (3) $2B + 3H_2S_2 \rightarrow B_2S_3 + 3H_2S$ (4) $B_4H_{10} + 5S + 6H_2S_2 \rightarrow 2B_2S_3 + 11H_2S$ (C) *Hydrogen sulfide generating reactions*

(1) $2CHOOH + Na_2S \rightarrow H_2S + 2NaCHO_2$ (1a) $2CHOOH + K_2S \rightarrow H_2S + 2KCHO_2$ (2) $2CH_3COOH + Na_2S \rightarrow H_2S + 2NaC_2H_3O_2$ (2a) $2CH_3COOH + K_2S \rightarrow H_2S + 2KC_2H_3O_2$ (3) $NaSH + HCl \rightarrow NaCl + H_2S$ (3a) $KSH + HCl \rightarrow KCl + H_2S$ (3b) $LiSH + HCl \rightarrow LiCl + H_2S$ (4) $Na_2S + 2HCl \rightarrow 2NaCl + H_2S$ (4a) $K_2S + 2HCl \rightarrow 2KCl + H_2S$ (5) $Na_2S + 2H_2O \rightarrow H_2S + 2NaOH$ (6) $B_2S_3 + 3H_2O \rightarrow B_2O_3 + 3H_2S$ (7) $B_2S_3 + 6HF \rightarrow 2BF_3 + 3H_2S$ (8) $B_4H_{10} + 5S + 6H_2S_2 \rightarrow 2B_2S_3 + 11H_2S$ (9) $N_2H_4 + 2S \rightarrow N_2 + 2H_2S$ (10) $N_2H_4 + S \rightarrow N_2 + 2NH_3 + H_2S$ (D) *Oxidizing reactions for sulfides of hydrogen* (see Note 1)

(1) $3O_2 + 2H_2S$ (moist) $\rightarrow 2H_2O + 2SO_2$
(Catalysts: glass wool, silicic acid, $MnO_2$)

(2) $O_2 + NaOH + H_2S \rightarrow H_2SO_4 + Na_2SO_4$ (2a) $O_2 + NaOH + H_2S \rightarrow H_2O + SO_3 + Na_2SO_4$ (3) $H_2O_2 + H_2S \rightarrow H_2O + S$ vapor
(In absence of metallic hydroxides)

(4) $4H_2O_2 + H_2S \rightarrow 5H_2O + SO_3$
(catalysts: NaOH, KOH, $NH_3$)

(5) $Na_2O_2 + 2O_2 + 2H_2S \rightarrow 2H_2O + S$ vapor $+ Na_2SO_4$
(Catalysts: metallic hydroxides)

(6) $8HNO_3 + 4H_2S \rightarrow 4SO_2 + 8H_2O + 8NO$
(Oxidation more violent with fuming acid)

(7) $6H_2O_2 + H_2S_2 \rightarrow H_2O + SO_3 + SO_2$ (8) $H_2S_2 + 2Ca(MnO_4O_2 + 5H_2O) \rightarrow$
$6H_2O + 2SO_2 + CaO + 2MnO$ (E) *Metallic sulfide oxidizing reactions*

(1) $Na_2S + 4H_2O_2 \rightarrow Na_2SO_4 + 4H_2O$ (1a) $K_2S + 4H_2O_2 \rightarrow K_2SO_4 + 4H_2O$ (2) $Na_2S + 2H_2SO_4 \rightarrow Na_2SO_4 + 2H_2O_2 + SO_2 + S$ (2a) $K_2S + 2H_2SO_4 \rightarrow K_2SO_4 + 2H_2O + SO_2 + S$ (3) $Na_2S + 2O_2 \rightarrow Na_2O_2 + SO_2$ (3a) $K_2S + 2O_2 \rightarrow K_2O_2 + SO_2$ (4) $B_2S_3 + 3H_2O \rightarrow B_2O_3 + 3H_2S$ (5a) $B_2S_3 + 4½Cl \rightarrow 3SCl + BCl_3$ (5b) $3SCl + 6H_2O + 2BCl_3 \rightarrow 6HCl$
$+ 1½H_2S + B_2O_3 + 1½SO_2$ (F) *Oxygen generating reactions*

(1) $2Na_2O_2 + 2H_2O \rightarrow 4NaOH + O_2$ (2) $2H_2O_2 +$ heat or catalyst $\rightarrow 2H_2O + O_2$ (3) $H_2O_2 + K_2CrO$ (or Ca) $(MnO_4)_2$ etc. $\rightarrow H_2O + O_2$, etc.

(4) $H_2O_2 +$ acid solution of hypochlorites or ferricyanides $\rightarrow O_2$, etc.

(#1) NOTE.—Stability of $H_2SO_4$ and $SO_3$ favored by excess of oxidant and presence of steam and catalysts. Dissociation with formation of $SO_2$ encountered above 1000 degrees centigrade.

(G) *Hydrogen peroxide generating reactions*

(1) $Na_2O_2 + 2H_2O \rightarrow H_2O_2 + 2NaOH$ (2) $Na_2O_2 + 2HCl \rightarrow 2NaCl + H_2O_2$ (3) $Na_2O_2 + H_2SO_4 \rightarrow Na_2SO_4 + H_2O_2$ (4) $Na_2O_2 + 2HNO_3 \rightarrow 2NaNO_3 + H_2O_2$

ALTERNATIVE FORMS OF TYPICAL APPARATUS

In the foregoing description we have set forth the method and mode of operation of our invention when applied to a preferred design of apparatus, Figs. 1, 2, 3, in which the said method and operation can be carried out. In that description we have also set forth certain modifications of the apparatus and the method. It is to be understood, however, that the method and mode of operation can be carried out by other apparatus than that described in the foregoing specifications.

EXAMPLE 2 OF OUR PROCESS, DISCLOSING ALTERNATIVE APPARATUS THAT MAY BE USED FOR PROCESS OF EXAMPLE 1

Figures 4, 4A, 5, 6:
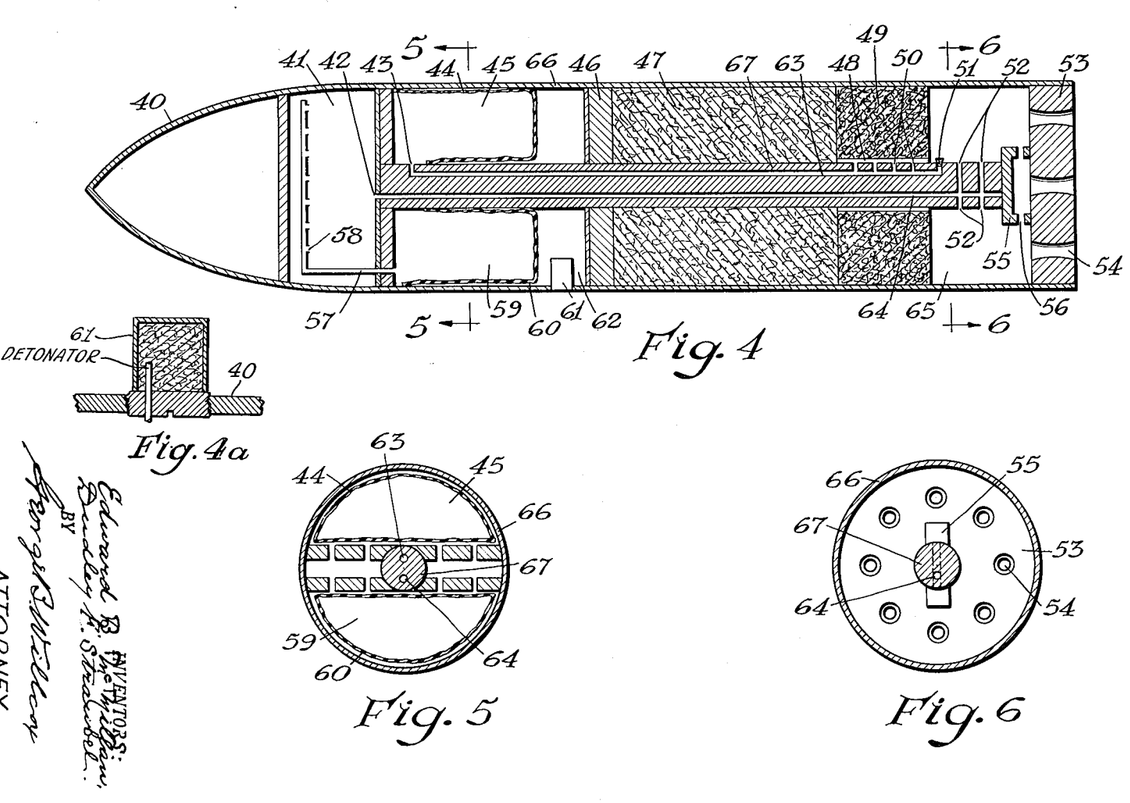
Fig. 4 is a diagrammatic longitudinal view in section, showing a different mechanism and arrangement of apparatus for performing our process.
Fig. 4a is a diagrammatic sectional view of a detonating capsule.
Fig. 5 is a transverse sectional view on the line 5—5 of Fig. 4.
Fig. 6 is a transverse sectional view on the line 6—6 of Fig. 4.

A different apparatus for the utilization of our power plant process may be enclosed in a cylindrical shell 66, Figs. 4, 5, 6. A stream-lined shape closes the forward end 40. The after end terminates in a nozzle plate 53. In the forward end is located an oxidizing-agent generator 41, containing a reactant such as sodium peroxide. Water fed under pressure from space 59 within bag 60 through conduit 57 and holes 58 generates oxygen, which is then injected into the main reaction chamber 65 through orifices 42 and 52 and by way of conduit 64.

The pressure behind the feeding action is generated in chamber 62 by the reaction of the calcium hydride contained in capsule 61 with water that nearly fills space 62. The power plant is started by the explosion of capsule 61, Fig. 4a, with a small powder charge. The ensuing pressure is transmitted to the non-oxidizing acid contents of space 45 within the bag 44, thus injecting them into the main reaction chamber through orifice 43, conduit 63 and orifices 50 and 51.

Conduit 57 and orifices 50 and 51 are initially sealed, but are opened by the creation of the feed pressure. The seal over orifices 50 is a film 48 and a small plug seals orifice 51.

The sulfur and metal reactants are lodged in the forward end of main reaction space 65 against wall 46 in the form of a briquet 47. This briquet consists of a compressed mixture of particles or layers of sodium and sulfur. The rate of reaction of this charge can be predetermined by decreasing particle sizes and increasing intimacy of mixture in sections of the briquet which are to react faster. Potassium or other finely divided metals of the previously specified group may be included.

Magnesium, aluminum, barium, and boron sulfides are particularly reactive to generate hydrogen sulfide in reaction with water and dilute acids. Our other sulfides become sufficiently reactive toward $H_2O$ at power plant operating temperatures.

The metallic hydrides may also be reacted with sulfur or sulfides to generate metallic sulfides, metallic hydrosulfides, and hydrogen sulfide in the main reaction. Useful hydrides include those of magnesium, strontium, barium, lithium, potassium, sodium, rubidium, cesium, and boron. The hydrosulfides of lithium, potassium, sodium, zinc, calcium, and barium, may be formed for useful further reaction.

Aft of briquet 47 is another, 49, consisting of a mixture of sodium peroxide with sulfur and a stabilizing agent such as sodium chloride. Peroxides of other metals of the specified group may also be used. This is the starting charge, but as in the previous process embodiment, may be omitted or included.

The main reaction begins with the spraying of formic or hydrochloric, etc., acid against charge 49. This is followed by the exothermic generation of sodium sulfide (reaction A) and hydrogen sulfide (reaction B). These are oxidized as they move aft by the oxygen injected from orifices 52 (reaction D).

The heat generated initiates the reaction of the sodium and sulfur charge, 47, that generates sodium sulfide, which is successively reacted so that first hydrogen sulfide is generated and then oxidized. The jet reaction then exhausts through nozzles 54. The central nozzle is only partially covered by bracket 55 which supports central member 67. This bracket is pierced with holes such as 56.

Figures 5 and 6 show sectional views, looking aft, at lines 5—5 and 6—6, respectively. The former is a cross-section through the acid and water feeding bags and the latter through the aft end of the main reaction chamber.

We have illustrated an elaborate and fairly comprehensive version of our process embodied in two different apparatus designs. We now describe an embodiment of a narrower interpretation of our invention.

EXAMPLE 3 OF OUR PROCESS.—THE REACTIONS

The following embodiment of our process represents its reduction to its simplest elements. Such a design might be employed as a jet assisted take-off unit, or as the motor for various other devices. An increase in the heat weight ratio has been obtained by carrying the oxidizing agent all prepared rather than generating it within the motor itself. Its design is illustrated diagrammatically in Figs. 7 and 8. The motor may be modified to obtain oxygen in air, by ram scoop action, as the oxidant.

There are two variations of our process preferred for this design, (D-1) and (D-4).

In the case of reaction D-4, 90 percent concentrated hydrogen peroxide is used as the oxidant. The heat gain may be compared very favorably with the reaction of aniline with oxygen from decomposed peroxide. Reaction D-4 exceeds the heat gain from the reaction of aniline with fuming nitric acid, used currently in large rocket engines for propulsion of aircraft. Fuming oxidizing acids may also be used for oxidation in our process.

In reaction "D-1" the fuel is liquified hydrogen sulfide and the oxidant is liquified oxygen. The former may be kept in storage by refrigeration with solidified carbon dioxide or with the liquid oxygen itself. The latter may be allowed some evaporation. The reaction may be described as follows, givng weight proportions of reactants, approximately:

67 parts of hydrogen sulfide
94 parts of oxygen
   yielding at 100 percent conversion:
35 parts of steam
126 parts of sulfur dioxide Catalysts for completion of the oxidation have been mentioned. It may be further aided by introduction of ice particles into the hydrogen sulfide or oxygen, and by coating the reaction chamber walls with silica gel.

In reaction "D-4" advantage is taken of the fact that hydrogen sulfide will react directly with hydrogen peroxide without the use of a permanganate to previously release the oxygen, as in the case of organic fuels, as generally used.

As in the case of the other variations in our process elsewhere described, the jet exhaust for "D-4" consists of an unusually dense mass, thus augmenting the thrust. Dissociation of our reaction ingredients and products at the higher temperatures of operation will alter our reaction equations some but not to serious disadvantage to our basic concept. Reaction "D-4" may be described as follows for low temperature conditions, the reactants and their approximate weight proportions being listed:

About 82 parts of 90% con. hydrogen peroxide
18 parts of hydrogen sulfide yielding at 100% conversion
   and temperatures under 900° C.:
53 parts of steam
47 parts of sulfur trioxide and lower oxides.

Ammonium sulfide, liquid ammonia, hydrazine, or hydrazine compounds may be dissolved in the hydrogen sulfide to promote the completeness and speed of the reaction.

The need of refrigeration of the fuel can be avoided by the use of hydrogen polysulfides in place of hydrogen sulfide.

EXAMPLE 3 OF OUR PROCESS.—THE EQUIPMENT

Figures 1B, 8:
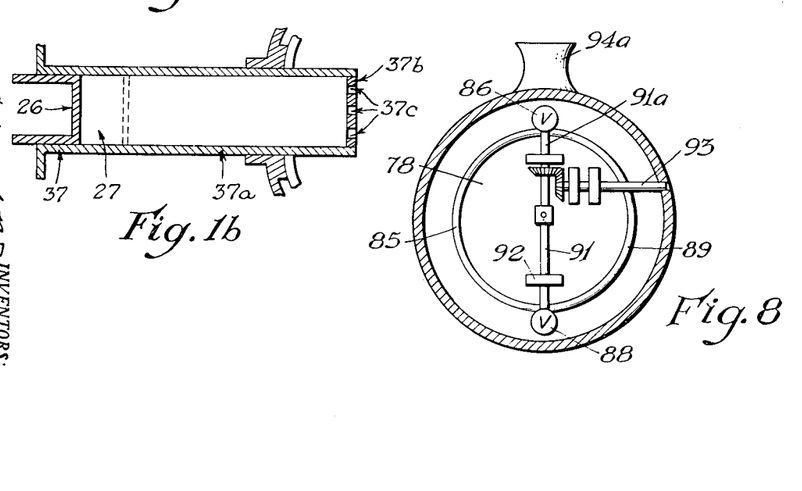
Fig. 1b is a fractional view in section showing the nozzle plate of Fig. 1a in place in the central cylinder.
Fig. 8 is a transverse sectional view on the line 8—8 of Fig. 7.
Figure 7:
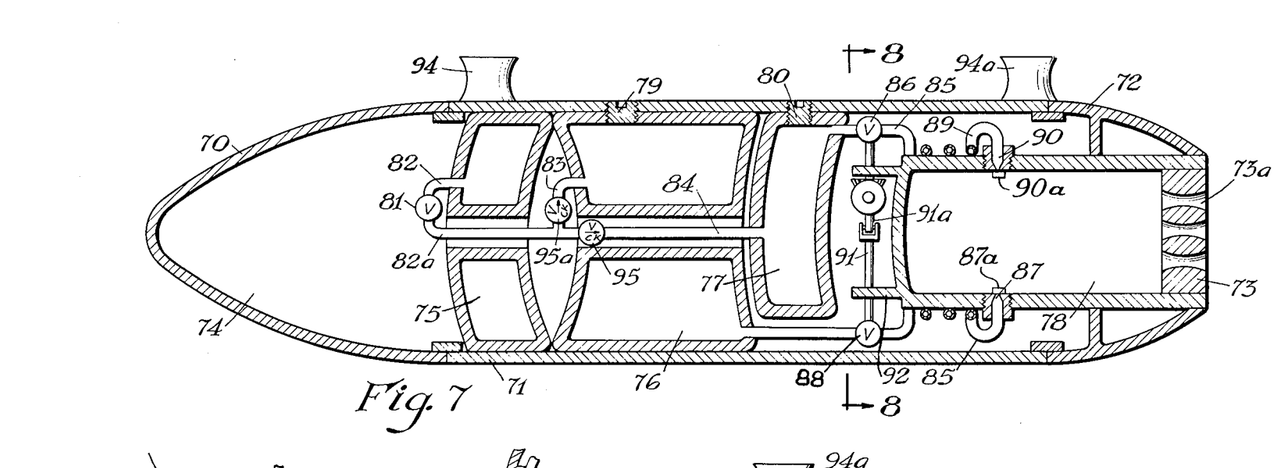
Fig. 7 is a diagrammatic longitudinal view in section, showing a third mechanism, being an assisted take-off motor for performing a simplified version of our process.

The jet motor apparatus used is shown in Figs. 7 and 8. It consists of a cylindrical shell 71, terminated at the forward end by a nose 70 for streamlining and at the after end by a tail cap 72, fastened to reaction chamber 78. The former may be opened to the atmosphere to obtain air, for use as an oxidant, by ram scoop action. The latter is closed by nozzle plate 73. Attachment brackets 94 and 94a attach the motor to the airplane, for jet assisted take-off.

Within the parts of the outer shell are a storage space 74, a compressed nitrogen tank 75, a liquid oxygen or hydrogen peroxide tank 76, a hydrogen sulfide tank 77, the reaction chamber 78, and various conduits and control valves. Valve 81 controls the application of nitrogen pressure through conduits 82 and 82a, check valves 95 and 95a, and conduits 83 and 84, to the oxidizing agent tank 76 and the hydrogen sulfide tank 77 respectively.

Tanks 76 and 77 are filled through screw plugs 79 and 80.

The pressure applied by the nitrogen breaks seals 87a, 90a, permitting the reactants to enter the reaction chamber 78 at injection orifices 87 and 90. The flow is metered by valves 86 and 88, for the hydrogen sulfide and the oxidant, respectively. These valves are in turn operated through rods 91 and 91a, supported from the outside of the reaction chamber wall by bearings 92. They are in turn operated by adjustment shaft 93, accessible from the outer surface of the motor.

The injection conduit 85 is heated by being wound around the forward end of the outside of the reaction chamber. Conduit 89 is similarly wound when the oxidant is liquid oxygen. The oxidation of the hydrogen sulfide occurs in reaction chamber 78, as the streams of hydrogen sulfide and the oxidant meet. The reaction products burst out of the chamber through converging-diverging nozzles 73a in nozzle plate 73, for propulsive thrust.

Other hydrogen sulfide oxidizing reactions useful in a design of this general character include use of the following oxidants: (1) fuming nitric acid reaction "D-6"; (2) nitric acid with hydrogen peroxide. The latter may be introduced into the nitric acid as sodium peroxide (reaction "G-4"). Liquid sulfides of hydrogen may also be used. These include the di-, tri-, and pentasulfides. The oxidation of the disulfide is illustrated in reaction "D-7."

The reaction of hydrogen peroxide, or hydrogen peroxide with nitric acid, or fuming nitric acid with liquified hydrogen sulfide may be initiated by a preheating reaction designed to prevent the motor from "freezing-up" from the initial expansion of the hydrogen sulfide. In the preheating reaction, hydrazine hydrate which has been stored in the hydrogen sulfide feed line between valve 86 and orifice 87 is injected into chamber 78 and reacts exothermically and violently with the oxidants being injected from orifice 90. The hydrogen sulfide stream soon follows and replaces the hydrazine hydrate in the reaction.

In our family of sulfides are several occurring as liquids at normal service temperatures. These are the polysulfides of hydrogen, previously referred to. They are particularly reactive and well suited to rapid oxidation. Examples of their reaction are given in the "Table of Reactions," D-7, and D-8, being typical. They may be used to great advantage in existing rocket engines, including the continuous firing ram jet and the firing of bombs propelled by a pulse jet engine. Their oxidation may be accelerated by basic salts, the oxides of copper, lead, mercury and silver, and permanganates and chromates. These can be used as reaction control agents in our process, to be injected in the ram scoop air stream. They may be stabilized for storage with dilute acids and may be dehydrated with boron trioxide and phosphorous pentoxide. It can be seen now that our invention includes the combination of a liquid fuel with a liquid oxidizing agent (such as hydrogen peroxide or calcium permanganate solution) neither requiring refrigeration for storage. These are liquid fuels capable of use in ram jet engines, where the oxidizing agent is largely atmospheric air. The versatility of our selected family of chemical reactions for jet propulsion is full and complete.

The formation and oxidation of the metallic sulfides can be accelerated violently by the injection of hydrazine or hydrazine hydrate, which may be included in the polysulfide solution.

Oxygen may also be obtained by the ram scoop action for injection of air into the combustion chamber.

In the foregoing disclosure we have explained how:

The uses of the sulfides as applied by us to the problems of jet-engine operation give oxidation reactions and sulfide forming reactions that are violent enough to yield results of the kind currently required in improvements of jet power.

AMPHOTERIC SULFUR

It will now apparent how our concept enables a jet power plant to realize the full advantage inherent in the amphoteric character of sulfur. When we react it with the metal or hydrogen or the metalloid and aluminum congener, boron, to form the sulfide, it acts like oxygen. But we get still another reaction, in which the sulfur itself is oxidized, together with the metal, or metalloid, or hydrogen.

The sulfur now acts, not as in the first case, like an oxidant, but as a reducing agent. Thus we get two exothermic reactions from the same material.

Another remarkable aspect of our invention is that our sulfur makes hydrogen available for jet reaction. For example, hydrogen alone is a gas which occupies too great a volume, when tanked, for airborne engine storage. Compressing it to a liquid for rockets is very difficult. We have found how to merely combine hydrogen with sulfur and thus get it into a most convenient and practical form for efficient jet engine service.

Also, our sulfur is present in a form most convenient for jet engine uses. Powdered sulfur is difficult to feed into an engine, but we have devised and disclosed herein a way of making sulfur available as a gas or a liquid that can be readily supplied and manipulated in jet propulsion devices. These hydrogen-sulfur compounds may be dissociated, without much loss of heat, for further reaction.

SIMPLICITY OF METHOD

Our invention satisfies a longfelt want. Research has been directed for many years toward developing enough energy (quantity and intensity) from rocket engines for practical use.

The bare idea of using sulfur in a dual role to collect energy from it twice is utterly simple; but so far as we are aware this has not been availed of heretofore in connection with the solution in practice of problems relating to jet-engine propulsion. Sulfur has ben regarded as an oxidation inhibitor.

First, we obtain energy from sulfur without oxidation, i. e. (formation of the sulfide), and then we oxidize the sulfur which an instant previous was itself simulating or performing like an oxidizing agent. Chemically this feature of our process is believed to be new, namely, our use of sulfur in such a way as to obtain energy twice in a high range of sustained propulsive pressure.

APPLICATION OR USE

Our contribution, therefore, is not merely the knowledge of how to accomplish the reactions. It is also in the application of that knowledge to more efficient and advantageous propelling of rockets and the like, as has been alluded to in the statement of objects, and described in the foregoing specifications.

HEAT ENERGY DEVELOPED

Our formation of the sulfides prior to their oxidation is most exothermic and is responsible to a great degree for our high heat gains.

Sulfur has commonly been regarded as a low reacting material; but we have developed means for raising the temperature and obtaining violent reactions. Some of our reactions (sodium and sulfur) start violently at slightly elevated temperatures. But our sulfides usually require higher than ordinary temperatures for their oxidation and that heat is supplied in the operation of our process.

Having now described and illustrated our process and types of apparatus for carrying out the process, we wish it to be understood that our invention is not to be limited to the specific form or arrangement of parts herein described and shown, or specifically covered by our claims.

Having thus described our invention, what we claim and desire to secure by Letters Patent is:

1. The process of creating and projecting finished jet material comprising supplying to a combustion zone a burst of reducing agent reactants in molten form under high pressure, said reactants consisting essentially of compounds of sulfur with at least one member of the group consisting of lithium, sodium, potassium, rubidium, cesium, hydrogen, calcium, strontium, barium, beryllium, magnesium, zinc, cadmium, aluminum, and boron, injecting an oxidant into said burst of reducing agent reactants at a rate and in a manner to effect an immediate and intimate mixture and explosive rate interaction with said reducing agent reactants to generate a great mass per unit of time of gas-like interaction products of low average molecular weight, retarding the escape of said mass of gas-like products to establish a high pressure and projecting said gas-like products in a high velocity jet by said pressure.

2. A process as set forth in claim 1 wherein the oxidant which is added to the reducing-agent reactants comprises concentrated non-decomposed hydrogen peroxide.

3. A process as set forth in claim 1 wherein the oxidant which is added to the said reducing-agent reactants comprises atmospheric air.

4. A process as set forth in claim 1 wherein there is added to the said reducing-agent reactants a reaction control substance.

5. The process of claim 1 wherein sulfur is reacted at explosive rate with at least one member of said group to supply said burst of reducing agent reactants and said burst is supplied to said combustion zone without substantial loss of heat or energy.

6. A process as set forth in claim 1, wherein there is added to the said reducing-agent reactants and oxidant, reaction control substances for violently accelerating the tempo of reaction in its various stages.

7. The process as set forth in claim 1, wherein there is added to the said reducing-agent reactants fluxing agents adapted to fuse the solid products that result from said reaction of sulfur compounds with a substance of the stated group.

8. The process of creating and projecting finished jet material comprising supplying to a combustion zone a burst of reducing agent reactants in molten form under high pressure, said reactants consisting essentially of compounds of sulfur with at least one member of the group consisting of lithium, sodium, potassium, rubidium, cesium, hydrogen, calcium, strontium, barium, beryllium, magnesium, zinc, cadmium, aluminum, and boron, injecting a non-oxidizing acid into said burst of reducing agent reactants in a manner to effect an immediate and intimate mixture, injecting an oxidizing agent into said mixture at a rate and in a manner to effect an immediate and intimate mixture and explosive rate interaction with said reducing agent reactants to generate a great mass per unit time of gas-like interaction products of low average molecular weight, retarding the escape of said mass of gas-like products to establish a high pressure, projecting said mass of gas-like products in a high velocity jet by said pressure, and injecting water into said stream of reducing agent reactants when said pressure has been established.

9. A process as set forth in claim 8 wherein the oxidant which is added to the reducing-agent reactants comprises non-decomposed hydrogen peroxide.

10. The process as set forth in claim 8 wherein the oxidant which is added to said reducing-agent reactants comprises atmospheric air.

11. The process as set forth in claim 8 wherein there is added to the said reducing-agent reactant a reaction control substance.

12. The process of claim 8 wherein sulfur is reacted at explosive rate with at least one member of said group to supply said burst of reducing agent reactants and said burst is supplied to said combustion zone without substantial loss of heat or energy.

13. The process as set forth in claim 8 wherein there is added to the said reducing-agent reactants fluxing agents adapted to fuse the solid ingredients that result from said reaction of sulfur compounds with a substance of the stated group.

14. The process of creating and projecting finished jet material comprising supplying to a combustion zone a burst of reducing agent reactants in molten form under high pressure, said reactants consisting essentially of compounds of sulfur with at least one member of the group consisting of lithium, sodium, potassium, rubidium, cesium, hydrogen, calcium, strontium, barium, beryllium, magnesium, zinc, cadmium, aluminum, and boron, injecting a non-oxidizing acid into said burst of reducing agents in a manner to effect an immediate and intimate mixture and explosive rate interaction with said reducing agent reactants to generate a great mass per unit time of gas-like interaction products of low average molecular weight, retarding the escape of said mass of gas-like products to establish a high pressure, projecting said mass of gas-like products in a high velocity jet by said pressure, and injecting water into said stream of reducing agent reactants when said pressure has been established.

15. The process as set forth in claim 14 wherein there is added to the said reducing-agent reactant a reaction control substance.

16. The process of claim 14 wherein sulfur is reacted at explosive rate with at least one member of said group to supply said burst of reducing agent reactants and said burst is supplied to said combustion zone without substantial loss of heat or energy.

17. The process as set forth in claim 14 wherein there is added to the said reducing-agent reactant fluxing agents adapted to fuse the solid products that result from said reaction of sulfur compounds of the stated group.

No references cited.